US012748243B2

(12) United States Patent
Kondo et al.

(10) Patent No.: US 12,748,243 B2
(45) Date of Patent: Sep. 29, 2026

(54) OPTICAL COMPONENT INTEGRALLY FORMED OF TRANSPARENT RECTANGULAR SOLID PORTION AND LENS, AND OPTICAL MODULE USING THE SAME

(71) Applicant: ALPS ALPINE CO., LTD., Tokyo (JP)

(72) Inventors: Yasuyuki Kondo, Niigata (JP); Junya Ogata, Niigata (JP)

(73) Assignee: ALPS ALPINE CO., LTD., Tokyo (JP)

( * ) Notice: Subject to any disclaimer, the term of this patent is extended or adjusted under 35 U.S.C. 154(b) by 718 days.

(21) Appl. No.: 18/055,495

(22) Filed: Nov. 15, 2022

(65) Prior Publication Data

US 2023/0075280 A1 Mar. 9, 2023

Related U.S. Application Data

(63) Continuation of application No. PCT/JP2021/017842, filed on May 11, 2021.

(30) Foreign Application Priority Data

Jun. 11, 2020 (JP) ................................ 2020-101765

(51) Int. Cl.
*G02B 3/04* (2006.01)

(52) U.S. Cl.
CPC ..................................... *G02B 3/04* (2013.01)

(58) Field of Classification Search
CPC ....... H01S 5/4087; H01S 5/4012; H01S 5/005
See application file for complete search history.

(56) References Cited

U.S. PATENT DOCUMENTS

2010/0033849 A1 2/2010 Seki et al.
2016/0313520 A1 10/2016 Shinohara et al.
2019/0319424 A1 10/2019 Kihara

FOREIGN PATENT DOCUMENTS

CN C-10-8761586 * 11/2018 .............. G02B 3/04
JP 5074017 11/2012
JP 2017-130543 7/2017
JP 2018-072499 5/2018

(Continued)

OTHER PUBLICATIONS

International Search Report for PCT/JP2021/017842 mailed on Aug. 10, 2021.

*Primary Examiner* — Lauren Nguyen
(74) *Attorney, Agent, or Firm* — IPUSA, PLLC

(57) ABSTRACT

An optical component includes a transparent rectangular solid portion having a height-to-width ratio greater than 1 in a plane perpendicular to an optical axis of the transparent rectangular solid portion, and a lens provided to the transparent rectangular solid portion at one or both of a light incident side and a light exit side of the transparent rectangular solid portion. The transparent rectangular solid portion and the lens form a lens body having a first surface that includes a flat contact surface. A perpendicular line drawn from the center of mass of the lens body to the flat contact surface is coincident with or close to a line segment connecting the center of the flat contact surface and the center of mass of the lens body in a predetermined range.

14 Claims, 10 Drawing Sheets

(56) References Cited

FOREIGN PATENT DOCUMENTS

| | | | | |
|---|---|---|---|---|
| JP | 2019-186554 | | 10/2019 | |
| WO | WO-2015-088032 | * | 6/2015 | ............. C03C 27/10 |
| WO | 2016/098833 | | 6/2016 | |

* cited by examiner

OPTICAL COMPONENT INTEGRALLY FORMED OF TRANSPARENT RECTANGULAR SOLID PORTION AND LENS, AND OPTICAL MODULE USING THE SAME

CROSS-REFERENCE TO RELATED APPLICATION(S)

This application is a continuation application filed under 35 U.S.C. 111(a), and claims benefit under 35 U.S.C. 120 and 365(c) of PCT International Application No. PCT/JP2021/017842 filed May 11, 2021 and designating the United States. This PCT International Application claims priority to earlier Japanese Patent Application No. 2020-101765 filed Jun. 11, 2020, the content of which is incorporated herein by reference in its entirety.

TECHNICAL FIELD

The present invention relates to an optical component, and an optical module using the same.

BACKGROUND

As the Internet of Things (IoT) and cloud services continue to become more widespread, the amount of data transferred in fiber-optic networks continues to rapidly increase, and thus better transmission rates and better quality are ever in demand. Meanwhile, due to there being a requirement for downsizing optical communication apparatuses, a compact and high-density configuration is needed for individual optical components and/or an optoelectronic components assembled into a communication module.

A configuration is proposed in which protrusions are formed at the four corners of a rectangular lens used in fiber-optical communications for the purpose of increasing the area of the mounting surface of the lens and enhancing the adhesive fixation of the lens during assembly. See, for example, Patent Document 1 presented below.

In addition to the downsizing requirement, multichannel transmission is in progress in fiber-optic communication modules using optical components. In a multichannel optical transceiver, a plurality of channels are arranged in parallel at narrow spatial intervals, and the width of optical components used in each channel has to be set smaller than the height.

With this overall downsizing of optical components, narrower beam formation and short-focus lenses are required. It is necessary for the lens to be thinned in the optical axis direction; however, a vertically elongated lens with reduced width and thickness is unstable and prone to tilting and falling over.

It is desired to reduce a size of an optical component used in fiber-optic communications, while providing stability during mounting and/or assembly.

Related art document(s) described above is

Patent Document 1: JP 5074017 B.

SUMMARY

In one aspect of the disclosure, an optical component includes

- a transparent rectangular solid portion having a height-to-width ratio greater than 1 in a plane perpendicular to an optical axis of the transparent rectangular solid portion, and
- a lens provided to the transparent rectangular solid portion at one or both of a light incident side and a light exit side of the transparent rectangular solid portion,
- wherein the transparent rectangular solid portion and the lens form a lens body having a first surface that includes a flat contact surface, and
- wherein a perpendicular line drawn from a center of mass of the lens body to the flat contact surface is coincident with or close to a line segment connecting a center of the flat contact surface and the center of mass of the lens body in a predetermined range.

EMBODIMENTS

The embodiments described below provide an optical component that is used in fiber-optic communications, has a compact configuration, and provides satisfactory stability during mounting and/or mounting. The size of an optical module using the optical component is also reduced, and the reliability in operation of such an optical module is improved.

Prior to describing the detailed structure of an optical component according to an embodiment, the technical problem arising in a thin vertical lens will be described in more detail, with reference to FIG. 1.

Figure 1:
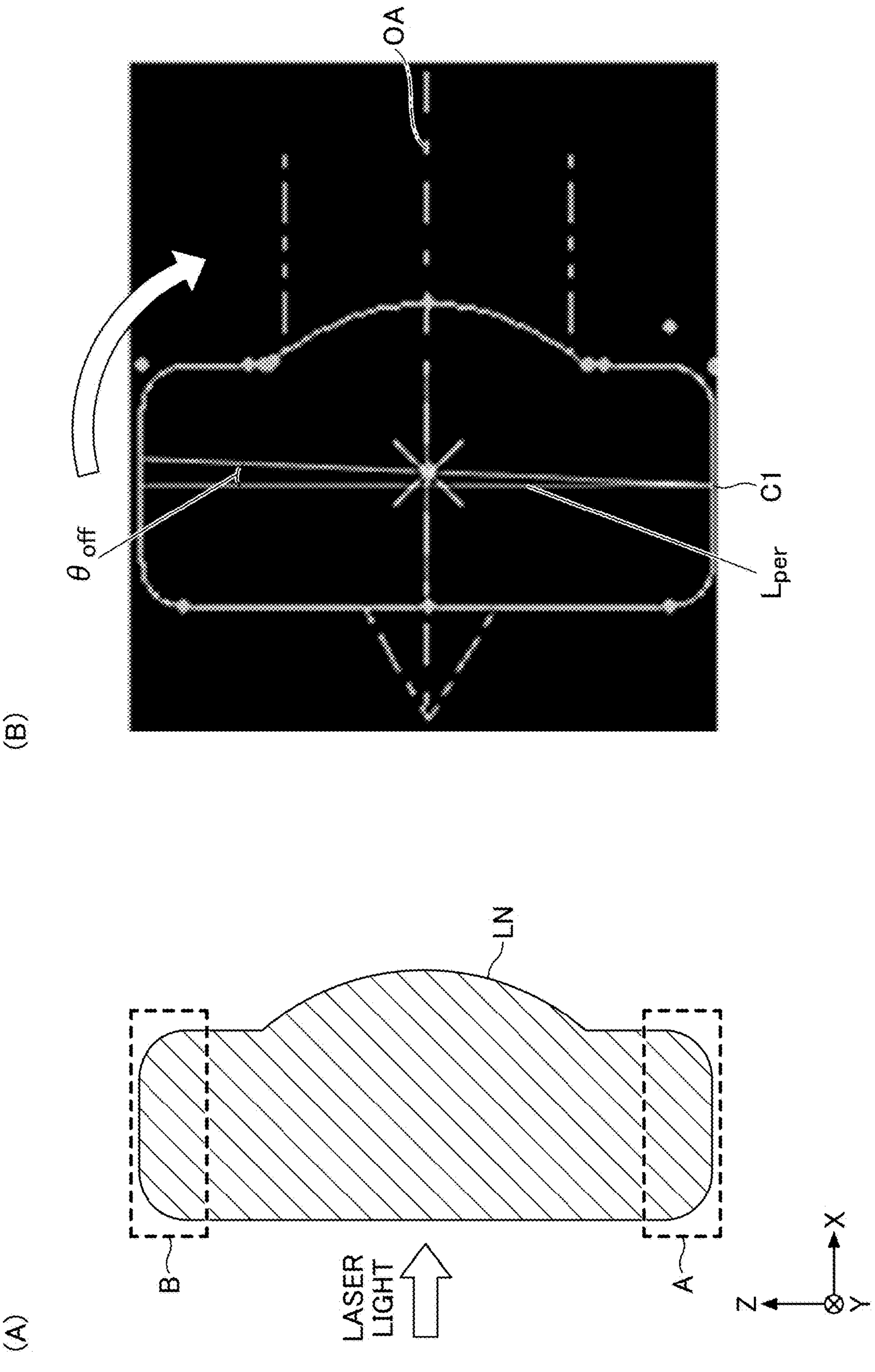
FIG. 1 shows a technical problem arising in a vertical lens.

FIG. 1 shows a conventional lens used as an optical component, in which (A) is a schematic side view of the lens in the XZ plane, and (B) is an optical path diagram which includes the optical axis OA and the center of mass of the lens. The center of mass of the lens is represented by a cross mark. The traveling direction of light is the X direction, the height direction of the lens is the Z direction, and the direction perpendicular to both the X and Z directions is the Y direction.

The conventional lens has a bottom part A, a top part B, and a lens part LN. In mounting this lens onto a substrate or a circuit board (collectively referred to as "substrate"), the lens is picked up at the top part B, and transported to the mounting position at which the bottom part A of the lens is fixed to the substrate. The lens part LN is a convex lens in this example, which collimates the incident laser light at the mounting position.

If the thickness of the lens is reduced as a whole in order to reduce the size, the center of mass of the lens shifts forward along the optical axis OA, that is, toward the light exit side. In (B) of FIG. 1, the center of mass of the lens indicated by the cross mark is shifted in the positive X direction from the perpendicular line $L_{per}$ extending from the center C1 of the bottom part A to the optical axis OA.

In other words, the line segment connecting the center C1 of the bottom part A and the center of mass of the lens is tilted forward (in +X direction) from the perpendicular line $L_{per}$ by an angle $\theta_{off}$. As a result, the lens tends to tilt forward in the thickness direction, as indicated by the white arrow in the figure. If the lens part is provided onto the rear surface (i.e., at the laser light incident side) of the lens, then the lens tends to tilt backward (in −X direction) depending on the position of the center of mass of the lens.

If the width (the dimension along the Y axis) of the lens is narrowed, in addition to the thickness of the lens, for the purpose of reducing the size, the fixed area of the bottom part A becomes smaller, which makes it difficult for the lens to stand on its own when mounted on the substrate. If the center of mass of the lens is deviated, the lens may be fixed while tilted.

The top surface of the top part B of the lens is also narrowed, which makes it difficult for the lens to be picked up or held in a stable manner. When a vacuum chuck is used to pick up the lens, the suction force acting on the top surface of the lens may be insufficient, and the lens may drop down while being moved.

The configuration provided by an embodiment solves at least one of the above-described problems, and allows a rectangular lens with reduced thickness and width to be mounted in a stable manner.

Figure 2:
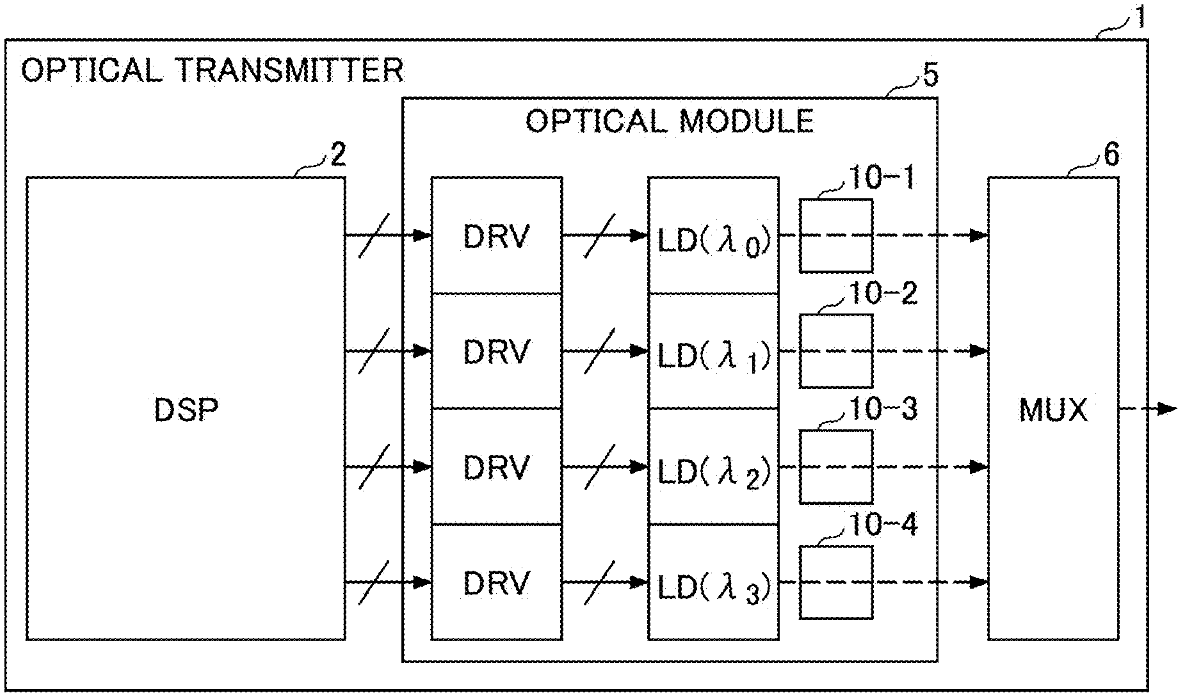
FIG. 2 is a schematic diagram of an optical transmitter which includes an optical module using an optical component according to an embodiment.

FIG. 2 is a schematic diagram of an optical transmitter 1 to which an optical component 10 according to an embodiment is applied. The optical transmitter 1 has a digital signal processor (DSP) 2, an optical module 5, and a multiplexer 6. The optical module 5 is an optical transmission frontend module, and is configured as a four-channel optical transmission module in this example. Solid arrows represent electrical signals, and dashed arrows represent optical signals.

The optical module 5 has a driver circuit DRV, a laser diode (LD) used as a light source, and an optical component 10, which are provided for each of the channels. The driver circuit DRV generates a drive signal for driving the corresponding LD, based on the modulation data signal generated by the DSP2. The LDs have different wavelengths λ0 to λ3, and output modulated optical signals with different wavelengths according to the applied driving signals in the respective channels.

The optical components 10-1 to 10-4 are provided corresponding to the respective LDs. In the case where requirements for downsizing the optical module 5 are too stringent, it is desirable that the optical components 10-1 to 10-4 are arranged separately, rather than being integrated into an array. This is because the overall optical loss can be minimized by independently adjusting the position and the orientation of each of the optical components 10-1 to 10-4 depending on the positioning accuracy of the associated one of the LDs in the narrow space.

The light signals of the respective wavelengths are collimated or condensed by the optical components 10-1 to 10-4, and multiplexed by the multiplexer 6. The wavelength-multiplexed light signal is input to an optical fiber and transmitted to, for example, a server apparatus in a data center.

Although the optical components 10-1 to 10-4 are schematically depicted as four boxes in FIG. 2, in actuality, each of the optical components 10-1 to 10-4 has a vertically elongated shape with a width reduced in the arrayed direction of the channels, and with a thickness reduced in the optical axis direction. In order to individually adjust the positions or the orientations of the thus shaped optical components 10-1 to 10-4 inside the optical module 5, the optical component 10 itself needs to be stable. The following embodiments provide compact and stable configurations of optical components.

First Embodiment

Figure 3:
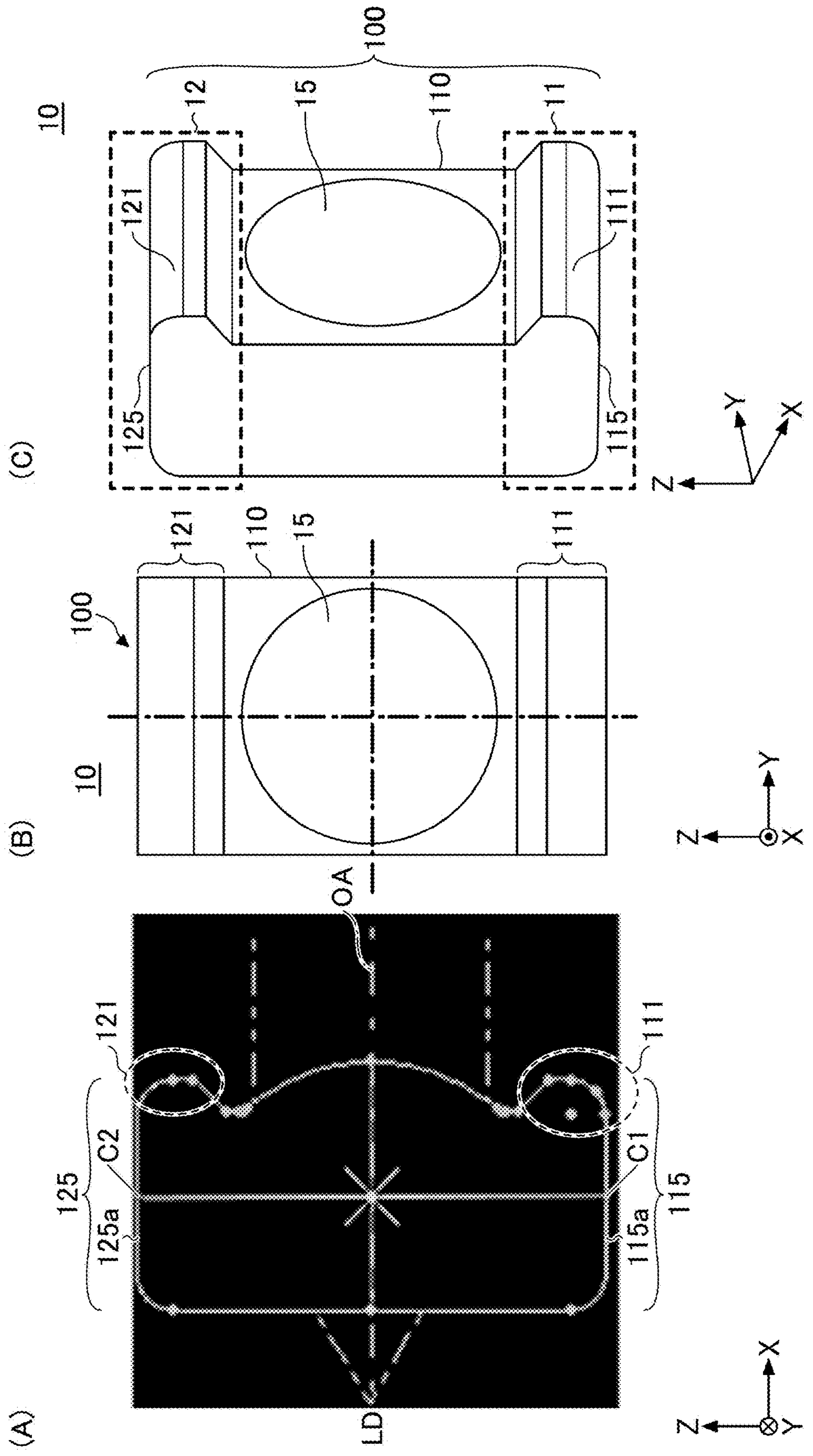
FIG. 3 illustrates an optical component according to a first embodiment.

FIG. 3 shows an optical component 10 according to the first embodiment. In FIG. 3, (A) is an optical path diagram, (B) is a front view of the optical component 10 viewed in the advancing direction of light (+X direction), and (C) is a perspective view of the optical component 10. As in FIG. 1, the advancing direction of light is the X direction, the height direction of the optical component 10 is the Z direction, and the direction perpendicular to both the X and Z directions is the Y direction. The Y direction is parallel to the width of the optical component 10.

The optical component 10 has a vertically elongated transparent solid 110 and a lens 15 provided on at least one of the light exit side or the light incident side of the transparent solid 110. A lens body 100 is configured with the transparent solid 110 and the lens 15. The transparent solid 110 has a shape of a rectangular solid whose height-to-width ratio in a plane perpendicular to the optical axis OA is greater than 1. For example, the height of the lens body 100 is 1.0 mm, while the width of the transparent solid 110 is set to 0.6 mm or less.

The lens body 100 has a bottom part 11 and a top part 12. The bottom part 11 has a first surface 115 which serves as an installation surface of the optical component 10. The top part 12 has a second surface 125 opposite to the first surface 115. When the optical component 10 is mounted onto a substrate, the top part 12 is held by vacuum suction, mechanical chucking, or other suitable means, and carried to a predetermined position to be mounted. At the mounting position, the position, the angle, the orientation, etc. of the optical component 10 are finely tuned with respect to the corresponding LD. After the position and the posture of the optical component 10 are determined, the optical component 10 is fixed at the first surface 115 to the substrate. More specifically, the optical component 10 is fixed to the substrate at a flat contact surface 115*a* included in the first surface 115.

The lens 15 is provided between the bottom part 11 and the top part 12, and configured to collimate the incident light from the LD into parallel light. Alternatively, the incident light may be focused at a predetermined position by adjusting the shape or the curvature of the lens 15. When the width and height of lens body 100 are set to 0.6 mm×1.0 mm, the radius of the lens 15 may be, for example, 0.27 mm to 0.28 mm. viewed in a vertical cross section along the optical axis OA, the shape of the lens body 100 is asymmetrical in the optical axis direction, that is, the lens body 100 has different cross-sectional shapes at the light exit side and the light incident side.

An optical component that is thin in the optical axis direction and is asymmetrically shaped along the optical axis, tends to fall over due to the deviation of the center of mass in the optical axis direction, as has been described with reference to FIG. 1. In order to solve this problem, the optical component 10 of the first embodiment is designed so that the center of mass of the lens body 100 (indicated by the cross mark) and the center of the contact surface 115*a* of the optical component 10 are located on the same line normal to the first surface 115.

In a more preferable configuration, the center of mass of the lens body 100, the center C1 of the contact surface 115*a*, and the center C2 of the top part 12 are positioned on the same line normal to the first surface 115. The second surface 125 of the top part 12 has a flat surface 125*a* which is picked up by vacuum suction or other means. The center of mass of the lens body 100 is located on the perpendicular line connecting the center C1 of the contact surface 115*a* of the bottom part 11 and the center C2 of the flat surface 125*a* of the top part 12.

To ensure the stability of the optical component 10, the lens body 100 may have a first projecting part 111 projecting in the optical axis direction from the bottom part 11. The first projecting part 111 may be formed over the entire width of the bottom part 11. The amount of projection of the first projecting part 111 in the optical axis direction may be uniform in the width direction. This configuration increases the bottom area and stabilizes the optical component 10.

The top part 12 of the lens body 100 may be provided with a second projecting part 121 projecting in the optical axis direction. The second projecting part 121 may be formed so that the amount of projection is constant over the entire width of the top part 12. This configuration increases the pickup area of the top part 12 used for carrying the optical component 10 to the mounting position, and stabilizes the posture of the optical component 10 being carried to the mounting position.

Figure 4:
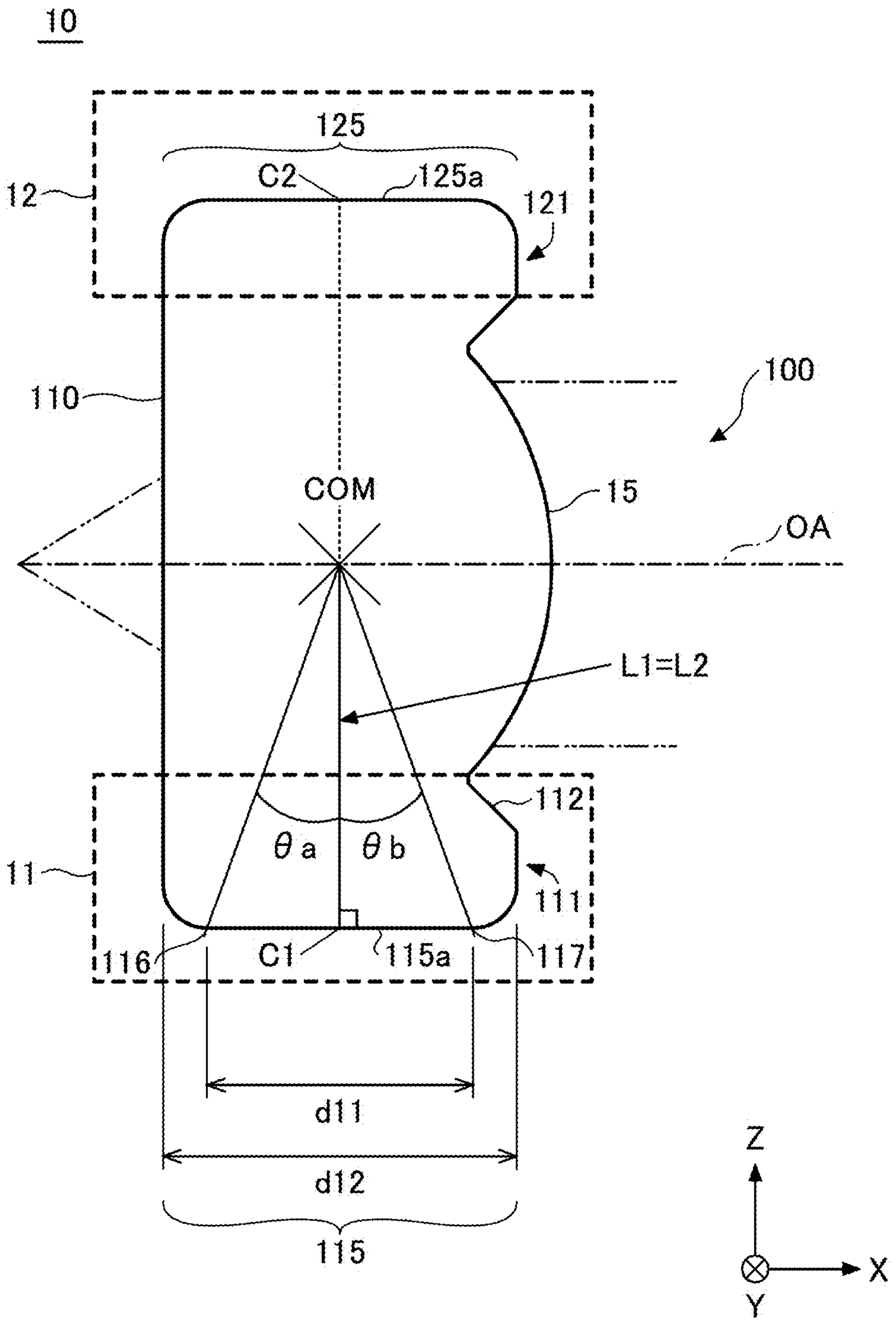
FIG. 4 shows parameters of the optical component according to the first embodiment.

FIG. 4 shows the parameters of the optical component 10. This figure is illustrated in a vertical cross-section of the optical component 10 along the optical axis OA. The lens body 100 has a center of mass COM on the optical axis OA. It is assumed that the dimension of the first surface 115 of the bottom part 11 in the optical axis direction is d12, and that the dimension of the contact surface 115*a* in the optical axis direction is d11. Preferably, d11 is greater than half (½) of d12. By making d11 greater than ½ of d12, the mounting stability of the optical component 10 is improved. For example, d12 may be set to 0.48 mm to 0.50 mm, and d11 may be set to 0.33 mm to 0.35 mm.

FIG. 4 shows an ideal configuration of the optical component 10. A perpendicular line L1 drawn from the center of mass COM normal to the contact surface 115*a* agrees with the line segment L2 which connects the center of mass COM and the center C1 of the contact surface 115*a*. In other words, in a vertical cross-section (i.e., the XZ plane) along the optical axis OA, the intersection of the optical axis OA and the perpendicular line $L_{per}$ (see FIG. 1), which extends from the center C1 of the contact surface 115*a* to the optical axis OA, coincides with the center of mass COM of the lens body 100.

The angle formed between the perpendicular line L1 and the line segment connecting the center of mass COM and the rear end 116 of the contact surface 115*a* is defined as a slant angle θa. The slant angle θa correlates with the force acting forward (in +X direction) of the lens body 100 from the surface on which the optical component 10 is mounted.

The angle formed between the perpendicular line L1 and the line segment connecting the center of mass COM and the front end 117 of the contact surface 115*a* is defined as a slant angle θb. The slant angle θb correlates with the force acting backward (in −X direction) of the lens body 100 from the surface on which the optical component 10 is mounted.

In FIG. 4, θa equals θb (θa=θb), and the forward force and the backward force acting on the optical component 10 are balanced. Thus, the optical component 10 stands stably by itself. More preferably, the lines extending from L1 and L2 pass through the center C2 of the flat surface 125*a* of the top part 12. The optical component 10 is not limited to this ideal form. The perpendicular line L1 and the line segment L2 may deviate from each other to a certain degree within an acceptable range. The acceptable amount of deviation will be described later with reference to FIG. 6.

Figure 5:
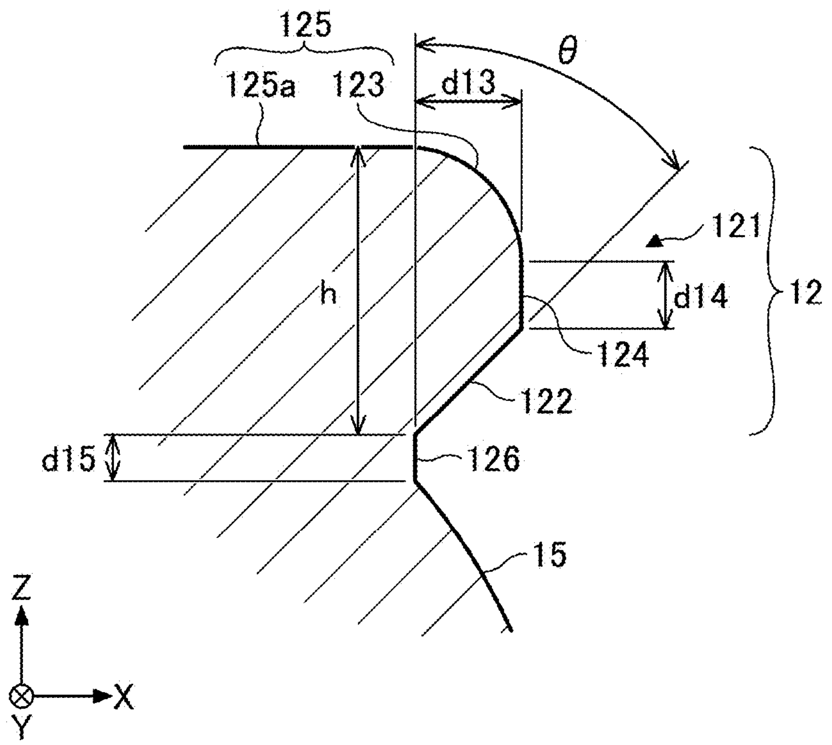
FIG. 5 shows a configuration example of a projecting part of the lens body.

FIG. 5 shows an example of parameters of the projecting part of the lens body 100. FIG. 5 illustrates only the second projecting part 121 of the top part 12; however, the parameters shown in FIG. 5 apply to the first projecting part 111 of the bottom part 11 when the top part 12 and the bottom part 11 are vertically symmetrical with respect to the optical axis OA.

The second projecting part 121 protrudes forward continuously from the flat surface 125*a* of the top part 12 in +X direction in this example. Likewise, the first projecting part 111 of the bottom part 11 protrudes forward continuously from the contact surface 115*a* (see FIG. 4) in +X direction.

The height (or the thickness) "h" of the second projecting part 121 is determined such that the second projecting part 121 does not easily break or chip, by taking the overall dimensions of the lens body 100 into account. For example, with the dimensions of the width and height of the lens body 100 of 0.6 mm×1.0 mm, the height h of the second projecting part 121 is preferably set to 0.2 mm or more. The same applies to the height of first projecting part 111 of the bottom part 11.

The second projecting part 121 may have a curved surface 123 continuously extending from the flat surface 125*a*, a flat vertical surface 124 continuing from the curved surface 123, and an inclined surface 122 continuing from the vertical surface 124. The flat surface 125*a* and the curved surface 123 form the second surface 125. The amount d13 of the X-direction projection of the second projecting part 121 may be set to almost half the difference between d12 and d11 shown in FIG. 4. For example, d13 is 0.07 mm to 0.08 mm.

The angle θ of inclination of the inclined surface 122 with respect to the Z axis is, for example, 40° to 50°, and in this example of FIG. 5, it is set to 45°. A flat part 126 may be provided between the second projecting part 121 and the lens 15. The height d15 of the flat part 126 is about 0.03 mm. By providing the flat part 126, the lens 15 and the inclined surface 122 are connected at an obtuse angle so as to avoid sharp cutting. By forming the second projecting part 121 with the curved surface 123, the vertical surface 124, and an inclined surface 122, and by providing the flat part 126 between the second projecting part 121 and the lens 15, a shape less likely to chip or break can be obtained. Substantially the same configuration applies to the first projecting part 111.

Figure 6:
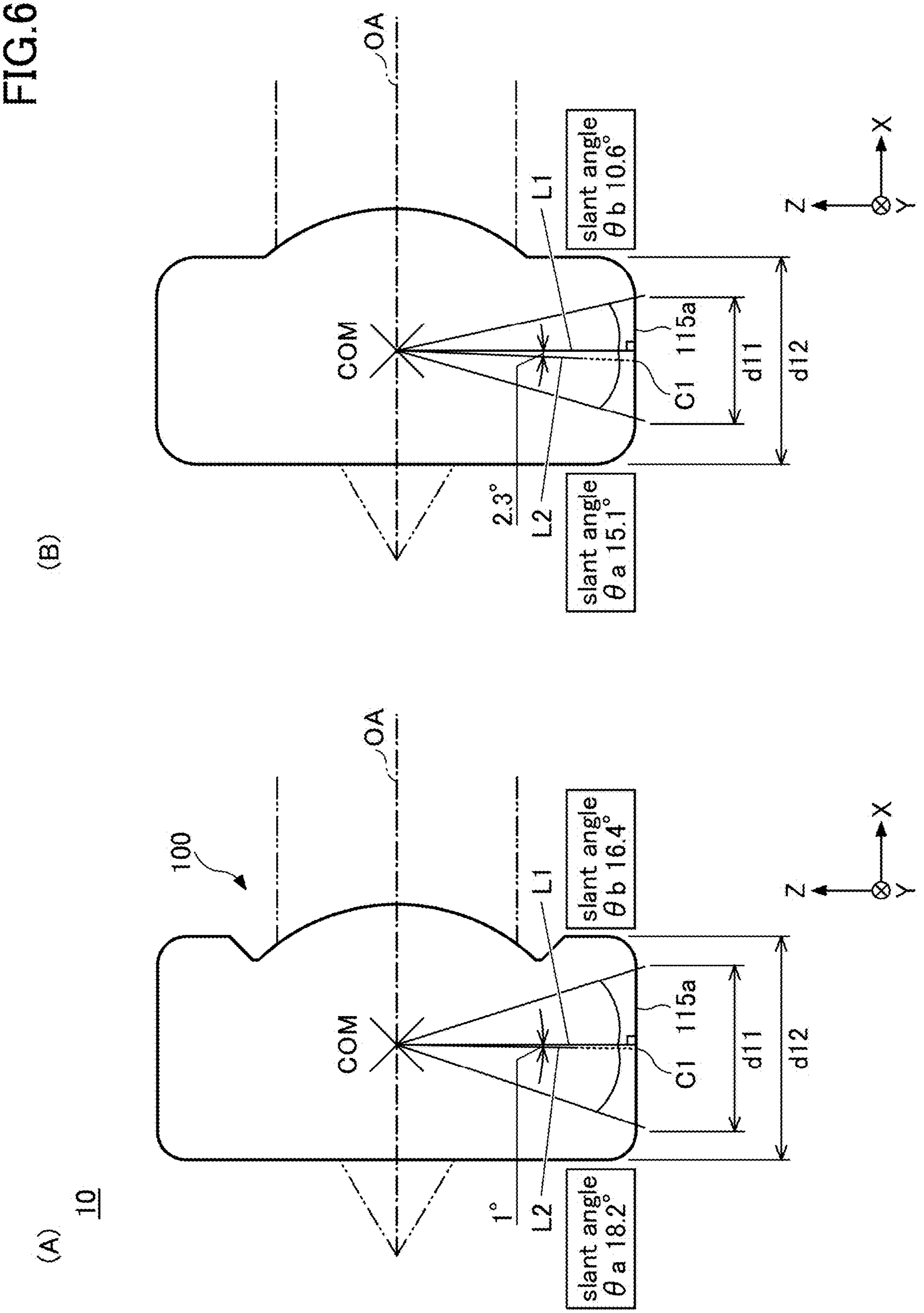
FIG. 6 illustrates the optical component of the first embodiment in comparison with a conventional optical component.

FIG. 6 shows a configuration example of the optical component 10, which has a certain tolerance. The perpendicular line L1 drawn from the center of mass COM downward to the contact surface 115*a* and the line segment L2 connecting the center of mass COM and the center C1 do not have to completely match each other, and they may deviate from each other within a predetermined range. In configuration (A) of FIG. 6, the line segment L2 is deviated from the perpendicular line L1 of the optical component 10 by an angle of 1°.

The deviation between the perpendicular line L1 and the line segment L2 is in the acceptable range if the amount of deviation is 10% or less of whichever the greater one of the slant angles θa and θb such that the stability of the vertically elongated lens body 100 is ensured. The deviation angle between the perpendicular L1 and the line segment L2 is approximately half the difference between the slant angles θa and θb.

Configuration (B) of FIG. 6 is a comparative example, illustrating a deviation angle of the conventional lens configuration shown in FIG. 1. The deviation angle between the perpendicular line L1 and the line segment L2 is 2.3°, and the center of mass COM shifts forward (in the X direction). This deviation angle exceeds 10% of the slant angle θa, and consequently stability cannot not be ensured any longer.

In contrast, with the optical component 10 of the first embodiment, the perpendicular line L1 drawn from the center of mass COM of the lens body 100 downward to the contact surface 115*a* of the bottom part 11 is coincident with or close to the line segment L2 connecting the center of mass COM and the center C1 of the contact surface 115*a* within a predetermined acceptable range of deviation angle. The optical component 10 can stand by itself on the substrate, and the position and/or the orientation of the optical component 10 can be adjusted in a stable manner at the mounting position.

When the deviation angle between the perpendicular line L1 and the line segment L2 is within the acceptable range, the line extended from the perpendicular line L1 passes through the vicinity of the center of the flat surface 125*a* of the top part 12. The optical component 10 can be maintained in a stable posture during transportation or repositioning to the mounting position, and the optical component 10 can be carried to the mounting position in a reliable manner.

Second Embodiment

Figure 7:
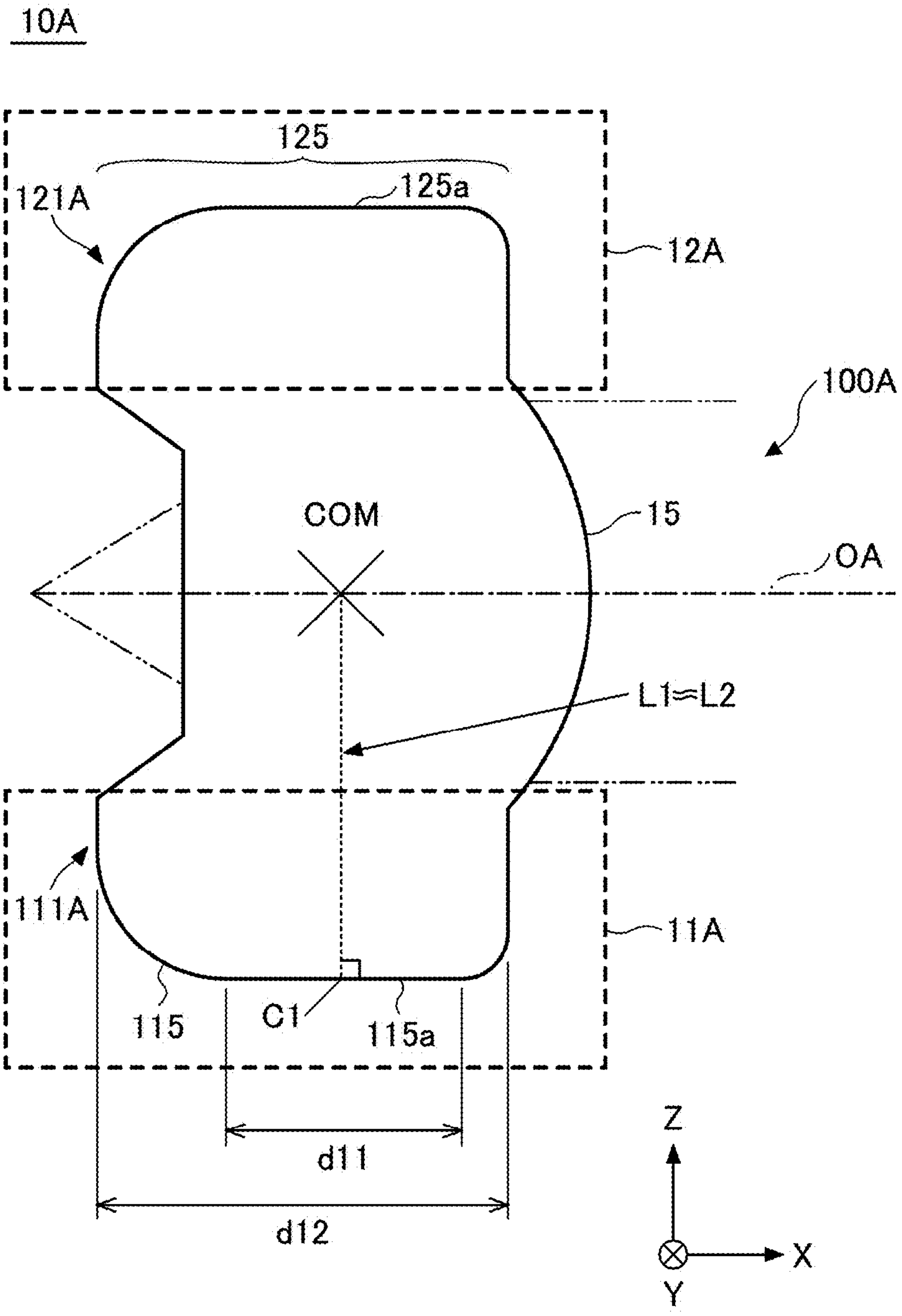
FIG. 7 is a schematic diagram of an optical component according to a second embodiment.

FIG. 7 is a schematic diagram of an optical component 10A according to the second embodiment. The optical component 10A is illustrated in a vertical cross-sectional view along the optical axis OA.

The optical component 10A has a first projecting part 111A and a second projecting part 121A, both at the back surface or the light incident side of the lens body 100A. The first projecting part 111A protrudes backward continuously from the contact surface 115*a* of the bottom part 11 in the −X direction. The second projecting part 121A protrudes backward continuously from the flat surface 125*a* of the top part 12 in the −X direction.

By providing the first projecting part 111A and the second projecting part 121A so as to be opposite to the lens 15, the lens body 100A is well balanced along the optical axis and stabilized. The first projecting part 111A and the second projecting part 121A are provided on the flat back surface opposite to the lens 15, and accordingly, the shapes of the first projecting part 111A and the second projecting part 121A are simplified and less likely to chip or break.

As in the first embodiment, the perpendicular line L1 drawn from the center of mass COM of the lens body 100A to the contact surface 115*a* and the line segment L2 connecting the center C1 of the contact surface 115*a* and the center of mass COM substantially match within the predetermined range. Further, the dimension d11 of the contact surface 115*a* along the optical axis is set to be greater than half the dimension d12 of the first surface 115 along the optical axis.

By providing the first projecting part 111A and the second projecting part 121A on the back surface of the lens body 100A, the center of mass COM shifts backward of the lens body 100A, compared to the first embodiment. The contact surface 115*a* is positioned slightly forward of the lens body 100A so that the perpendicular line L1 drawn from the center of mass COM to the contact surface 115*a* coincides within the predetermined range with the line segment L2 connecting the center C1 of the contact surface 115*a* and the center of mass COM.

In a more preferable configuration, the flat surface 125*a* of the second surface 125 slightly approaches the front side of the lens body 100A at the top part 12A, and the line extended from the perpendicular line L1 passes through or near the center of the flat surface 125*a* of the second surface 125. This configuration makes it easy for the optical component 10A to stand by itself at the mounting position, as well as to keep the posture of the optical component 10A stable during transportation to the mounting position, ensuring reliable transportation.

Third Embodiment

Figure 8:
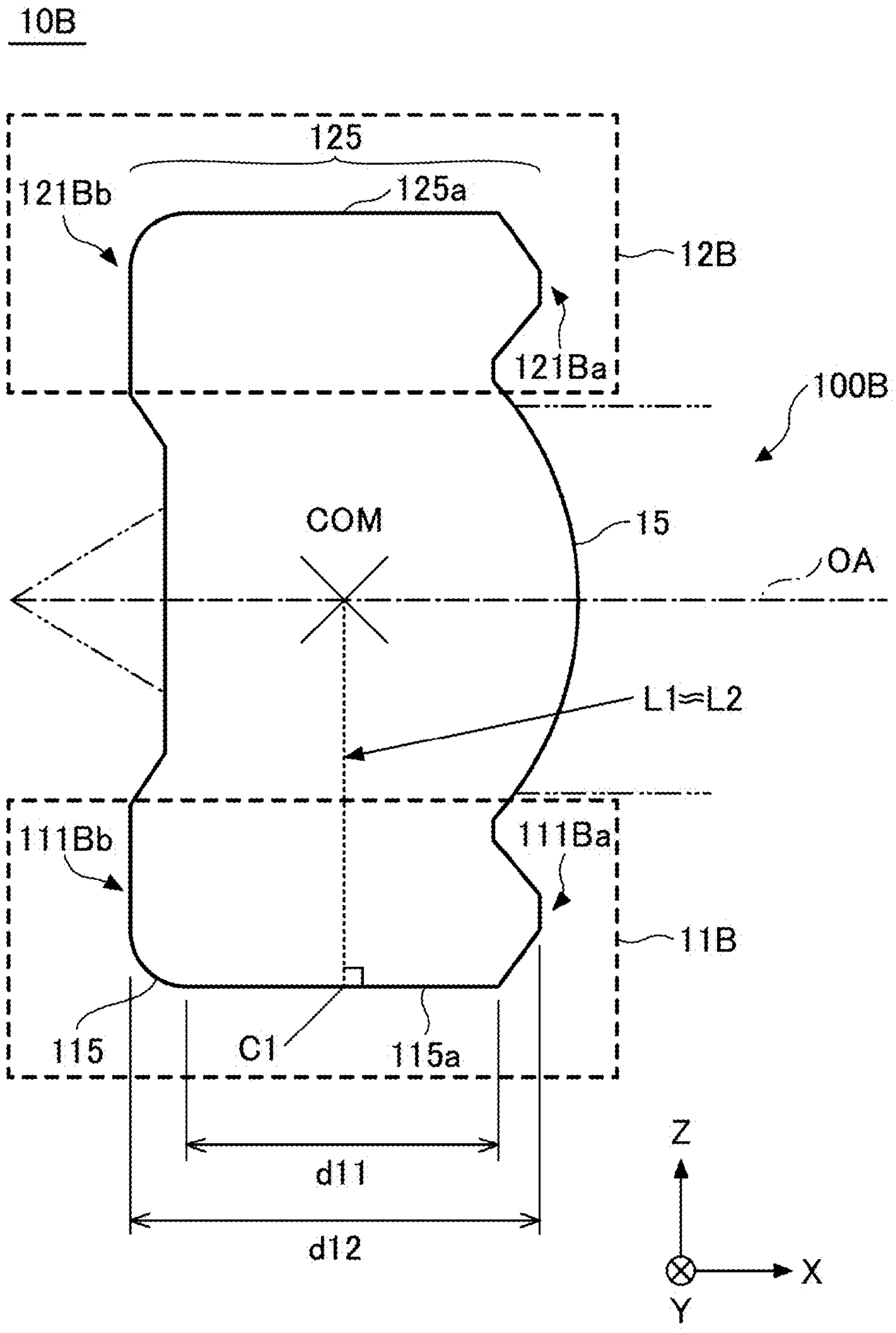
FIG. 8 is a schematic diagram of an optical component according to a third embodiment.

FIG. 8 is a schematic diagram of an optical component 10B according to the third embodiment. The optical component 10B is illustrated in a vertical cross-sectional view along the optical axis OA.

The optical component 10B has protrusions at both the light exit side (+X direction) and the light incident side (−X direction) of the lens body 100B. In the bottom part 11B, a first projecting part is formed of a protrusion 111Ba at the light exit side and a protrusion 111Bb at the light incident side. In the top part 12B, a second projecting part is formed of a protrusion 121Ba at the light exit side and a protrusion 121Bb at the light incidence side.

The protrusions 111Ba and 121Ba located at the light exit side are shaped so as not to interfere with the lens 15 and not to have an acute angle. With this configuration, the protrusions 111Ba and 121Ba are less likely to break or chip. The protrusions 111Bb and 121Bb located at the light incident side are shaped in a form with less unevenness. This configuration is advantageous when there is little space between the LD and the optical component 10B.

The amount of protrusion of the projecting part is dispersed between the light exit side and the light incident side. The proportion of the contact surface 115*a* occupying the first surface 115 is increased, and a sufficient area to be fixed onto the substrate is ensured during mounting or assembly. The proportion of the flat surface 125*a* occupying the second surface 125 is also increased, and the optical component 10B can be held by a sufficient suction force during transportation.

As in the first and second embodiments, the perpendicular line L1 drawn from the center of mass COM of the lens body 100B to the contact surface 115*a*, and the line segment L2 connecting the center of mass COM and the center C1 of the contact surface 115*a* substantially match within the predetermined range. The optical component 10B can stably stand by itself even in a narrow space in the optical axis direction.

Fourth Embodiment

Figure 9:
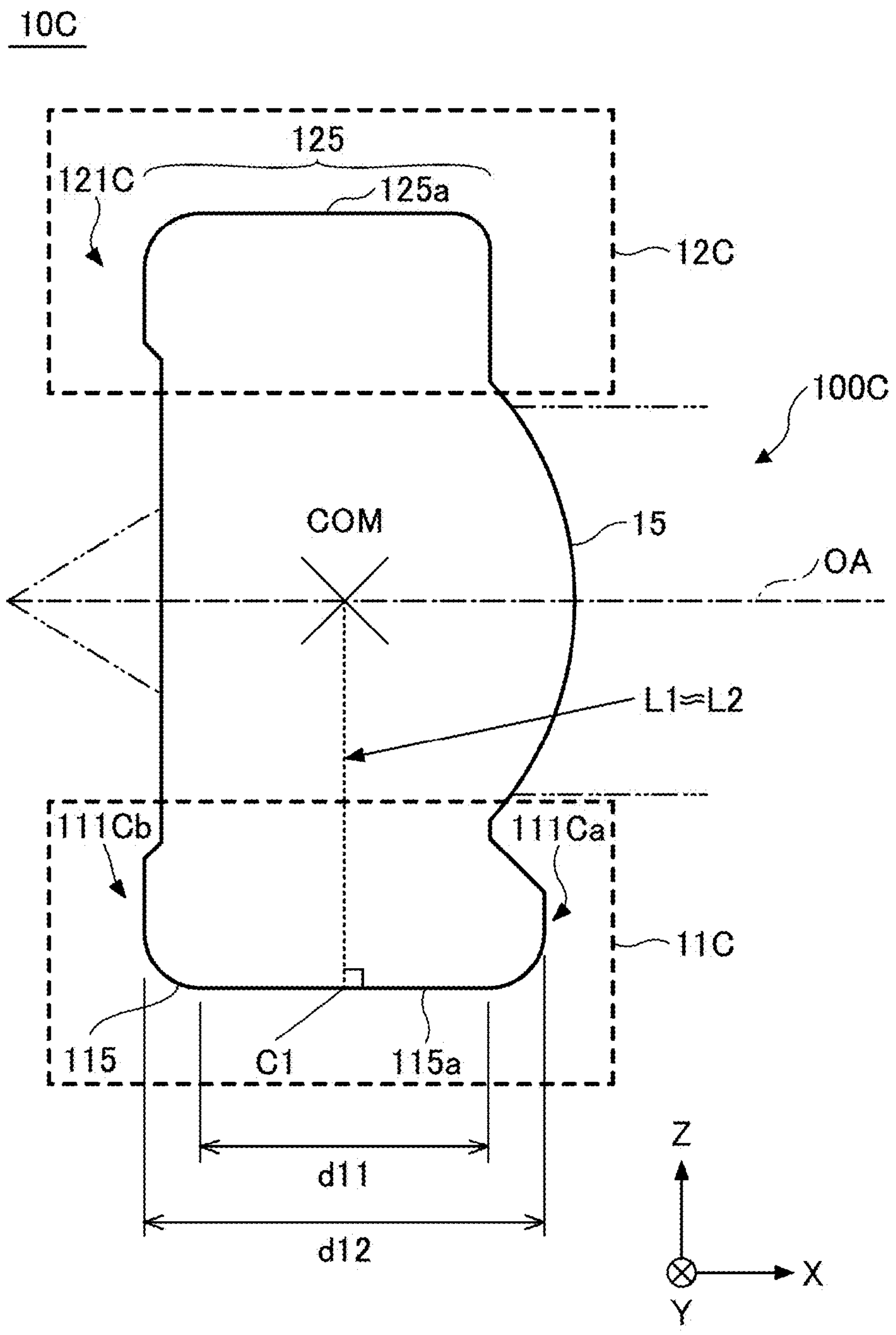
FIG. 9 is a schematic diagram of an optical component according to a fourth embodiment.

FIG. 9 is a schematic diagram of an optical component 10C according to the fourth embodiment. The optical component 10C is illustrated in a vertical cross-sectional view along the optical axis OA. In the optical component 10C, a bottom part 11C of a lens body 100C has protrusions at both light incident and light exit sides along the optical axis, while a top part 12C has a protrusion at only one of the light incident and light exit sides.

A first projecting part of the bottom part 11C is formed of a protrusion 111Ca at the light exit side and a protrusion 111Cb at the light incident side. The top part 12B has a protrusion 121C located at the light incident side, which serves as a second projecting part.

The protrusion 111Ca provided at the light exit side of the bottom part 11C is shaped so as not to interfere with the lens 15 and not to have an acute angle, so that a shape less likely to chip or break is obtained. The protrusions 111Cb and 121C provided at the light incident side are shaped in a form with less unevenness. This configuration is advantageous when there is little space between the LD and the optical component 10B.

The amount of protrusion of the projecting part of the bottom part 11C is distributed between the light exit side and the light incident side along the optical axis direction, and a wide contact surface 115*a* is ensured. At the top part 12C, the amount of protrusion in the optical axis direction is minimized. Therefore, the optical component 10C can stably stand by itself in a casing even with an insufficient space in the optical axis direction.

As in the first to third embodiment, the perpendicular line L1 drawn from the center of mass COM of the lens body 100C to the contact surface 115*a*, and the line segment L2 connecting the center C1 of the contact surface 115*a* and the center of mass COM substantially coincide within the predetermined acceptable range. By designing the optical component 10C so that the line extended from the perpendicular line L1 passes through or in the vicinity of the center of the flat surface 125*a* of the top part 12C, the optical component 10C can be held in a stable posture during transportation even if the lens body 100C is vertically asymmetric with respect to the optical axis OA.

Fifth Embodiment

Figure 10:
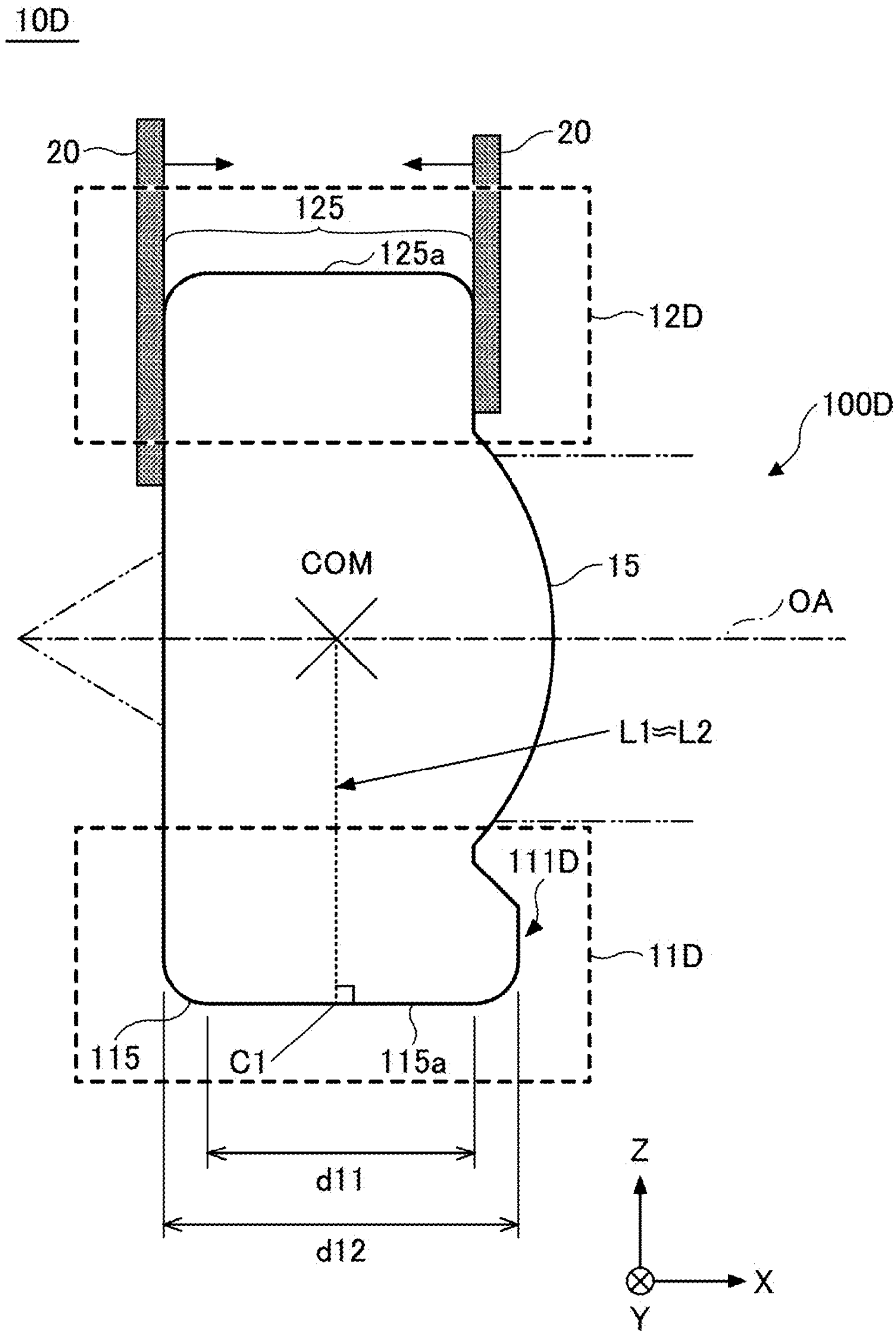
FIG. 10 is a schematic diagram of an optical component according to a fifth embodiment.

FIG. 10 is a schematic diagram of an optical component 10D according to the fifth embodiment. The optical component 10D is illustrated in a vertical cross-sectional view along the optical axis OA. In the optical component 10D, only the bottom part 11D has a first projecting part 111D. The top part 12D does not have a protrusion in the optical axis direction. This configuration is advantageous for gripping the top part 12D by a mechanical chuck 20. The optical component 10D can be securely gripped at the flat rear surface (at the light incident side) and the flat front surface (at the lens side) of the top part 12D of the lens body 100D.

As in the first to fourth embodiments, the perpendicular line L1 drawn from the center of mass COM of the lens body 100D to the contact surface 115*a*, and the line segment L2 connecting the center C1 of the contact surface 115*a* and the center of mass COM substantially coincide within the predetermined acceptable range. The optical component 10D can stably stand by itself, and shaping of the lens body can be facilitated because of its simple shape.

Although the invention has been described based on specific configuration examples, the present invention is not limited to the above-described configuration examples. The position of the lens 15 is not necessarily at the light exit side, and the lens 15 may be provided at the light incident side or at both the light incident and light exit sides of the optical component. In either case, the perpendicular line L1 drawn from the center of mass of the lens body to the contact surface of the bottom part, and the line segment L2 connecting the center of the contact surface and the center of mass coincide within a predetermined acceptable range.

Two or more of the first to fifth embodiments described above can be combined with one another. For example, in the configuration of FIG. 7 of the second embodiment, one or both of the bottom part 11A and the top part 12A of the lens body 100A may be provided with a protrusion projecting toward the light exit side (+X direction). In the bottom part 11D of FIG. 10 of the fifth embodiment, another protrusion may be provided at the light incident side (the −X side) in addition to the first projecting part 111D to disperse the amount of projection in the optical axis direction.

With such modifications, the center of mass COM of the lens body and the center C1 of the contact surface can be arranged on the same perpendicular line L1, and the posture of the optical component is stabilized during transportation, while preventing tilting or overturning. Further, by designing so that the center C2 of the top flat surface is located on the line extended from the perpendicular line L1, the posture of the optical component 10 is stabilized during transportation of the optical component 10 to the mounting position. Even if the optical component is quickly moved to the mounting position, the grip by vacuum suction or mechanical chucking is stable. At the mounting position, positioning and angle adjustment of the optical components can be performed in a stable manner, and therefore, the time required for the assembly process of the optical component 10 can be reduced as a whole.

This international application claims priority to earlier Japanese Patent Application No. 2020-101765 filed on Jun. 11, 2020, the content of which is herein incorporated by reference in its entirety.

What is claimed is:

1. An optical component comprising:

a transparent rectangular solid portion having a height-to-width ratio greater than 1 in a plane perpendicular to an optical axis of the transparent rectangular solid portion, and a lens provided only on a light exit side of the transparent rectangular solid portion, said lens not being provided on the light incident side of the transparent rectangular solid portion, wherein the transparent rectangular solid portion and the lens integrally form a lens body having a first surface that includes a flat contact surface, wherein a perpendicular line drawn from a center of mass of the lens body to the flat contact surface is coincident with or close to a line segment connecting a center of the flat contact surface and the center of mass of the lens body in a predetermined range, wherein the lens body includes a first projecting part protruding continuously from the first surface in an optical axis direction, wherein the first projecting part comprises a curved surface continuing from the flat contact surface, a vertical surface continuing from the curved surface, and an inclined surface continuing from the vertical surface toward the lens, wherein the transparent rectangular solid portion has the first projecting part protruding in an optical axis direction continuously from the first surface, and a second protecting part protruding in the optical axis direction continuously from a second surface of the lens body opposite to the first surface, wherein the lens is provided between the first projecting part and the second projecting part, wherein the second projecting part comprises a second curved surface continuing from a second contact surface that is included in the second surface, a second vertical surface continuing from the second curved surface, and a second inclined surface continuing from the second vertical surface toward the lens, and wherein the first projecting part and the second protecting part are connected at the light incident side through a flat surface.

2. The optical component as claimed in claim 1, wherein the predetermined range is a range in which a deviation angle between the perpendicular line and the line segment is 10% or less of a slant angle between the perpendicular line and a line connecting the center of mass and a rear end or a front end of the flat contact surface.

3. The optical component as claimed in claim 1, wherein a length of the flat contact surface in an optical axis direction is greater than half a length of the first surface in the optical axis direction.

4. The optical component as claimed in claim 1, wherein the first projecting part is formed over an entire width of the transparent rectangular solid portion.

5. The optical component as claimed in claim 4, wherein an amount of projection of the first projecting part in the optical axis direction is constant along a width of the lens body.

6. The optical component as claimed in claim 1, wherein the lens body has a second surface opposite to the first surface, the second surface including a flat surface.

7. The optical component as claimed in claim 6, wherein a center of the flat surface is located on a line extended from the perpendicular line.

8. The optical component as claimed in claim 6, further comprising:

a second projecting part protruding in an optical axis direction continuously from the second surface.

9. The optical component as claimed in claim 1, wherein the transparent rectangular solid portion has the first projecting part protruding in an optical axis direction continuously from the first surface, and a second projecting part protruding in the optical axis direction continuously from a second surface of the lens body opposite to the first surface, and wherein the lens is provided between the first projecting part and the second projecting part.

10. The optical component as claimed in claim 9, wherein a flat part is provided between the lens and at least one of the first projecting part or the second projecting part.

11. An optical module comprising:

a light source; and an optical component configured to collimate or condense a light beam emitted from the light source, wherein the optical component includes a transparent rectangular solid portion having a height-to-width ratio greater than 1 in a plane perpendicular to an optical axis of the transparent rectangular solid portion, and a lens provided only on a light exit side of the transparent rectangular solid portion, said lens not being provided on the light incident side of the transparent rectangular solid portion, wherein the transparent rectangular solid portion and the lens integrally form a lens body having a first surface which includes a flat contact surface, wherein a perpendicular line drawn from a center of mass of the lens body to the flat contact surface is coincident with or close to a line segment connecting a center of the flat contact surface and the center of mass of the lens body in a predetermined range, wherein the lens body includes a first projecting part protruding continuously from the first surface in an optical axis direction, wherein the first projecting part comprises a curved surface continuing from the flat contact surface, a vertical surface continuing from the curved surface, and an inclined surface continuing from the vertical surface toward the lens, wherein the transparent rectangular solid portion has the first projecting part protruding in an optical axis direction continuously from the first surface, and a second projecting part protruding in the optical axis direction continuously from a second surface of the lens body opposite to the first surface, wherein the lens is provided between the first projecting part and the second protecting part, wherein the second projecting part comprises a second curved surface continuing from a second contact surface that is included in the second surface, a second vertical surface continuing from the second curved surface, and a second inclined surface continuing from the second vertical surface toward the lens, and wherein the first projecting part and the second projecting part are connected at the light incident side through a flat surface.

12. The optical module as claimed in claim 11, comprising:

a plurality of said light sources; and a plurality of said optical components, each being provided for corresponding one of the light sources, wherein a position or an angle of each of the plurality of the optical components with respect to the corresponding one of the light source is adjusted independently from another one of the plurality of the optical components.

13. The optical component as claimed in claim 1, wherein the height of the first projecting part is set to 0.2 mm or more with the total height of the lens body being 1.0 mm.

14. The optical component as claimed in claim 1, wherein an angle of inclination of the inclined surface with respect to a height direction of the lens body is 40° to 50°.

* * * * *